United States Patent Office.

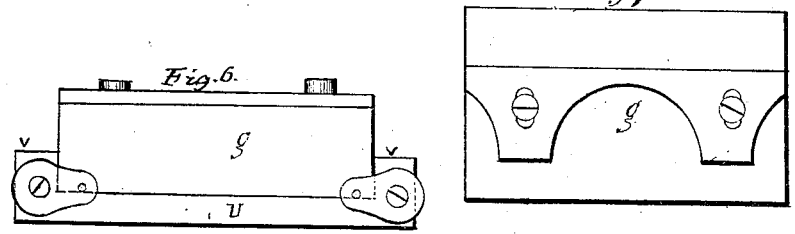
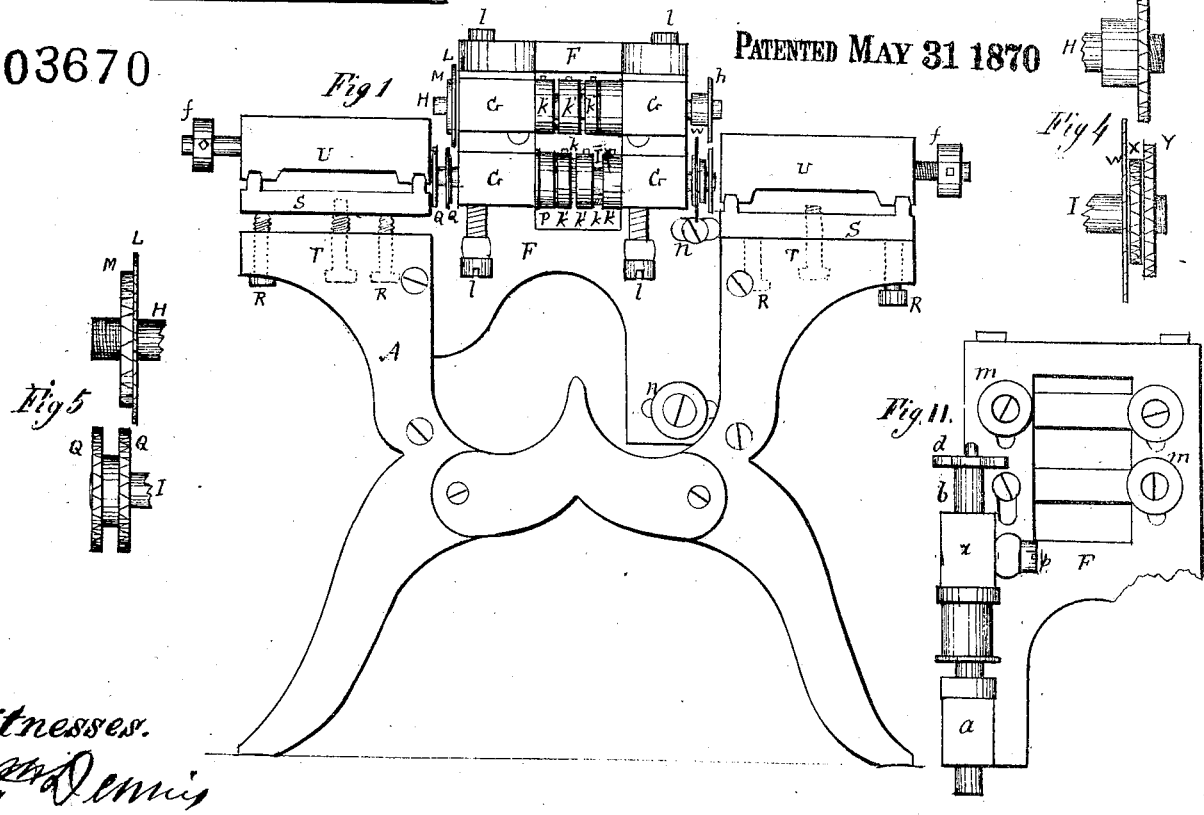
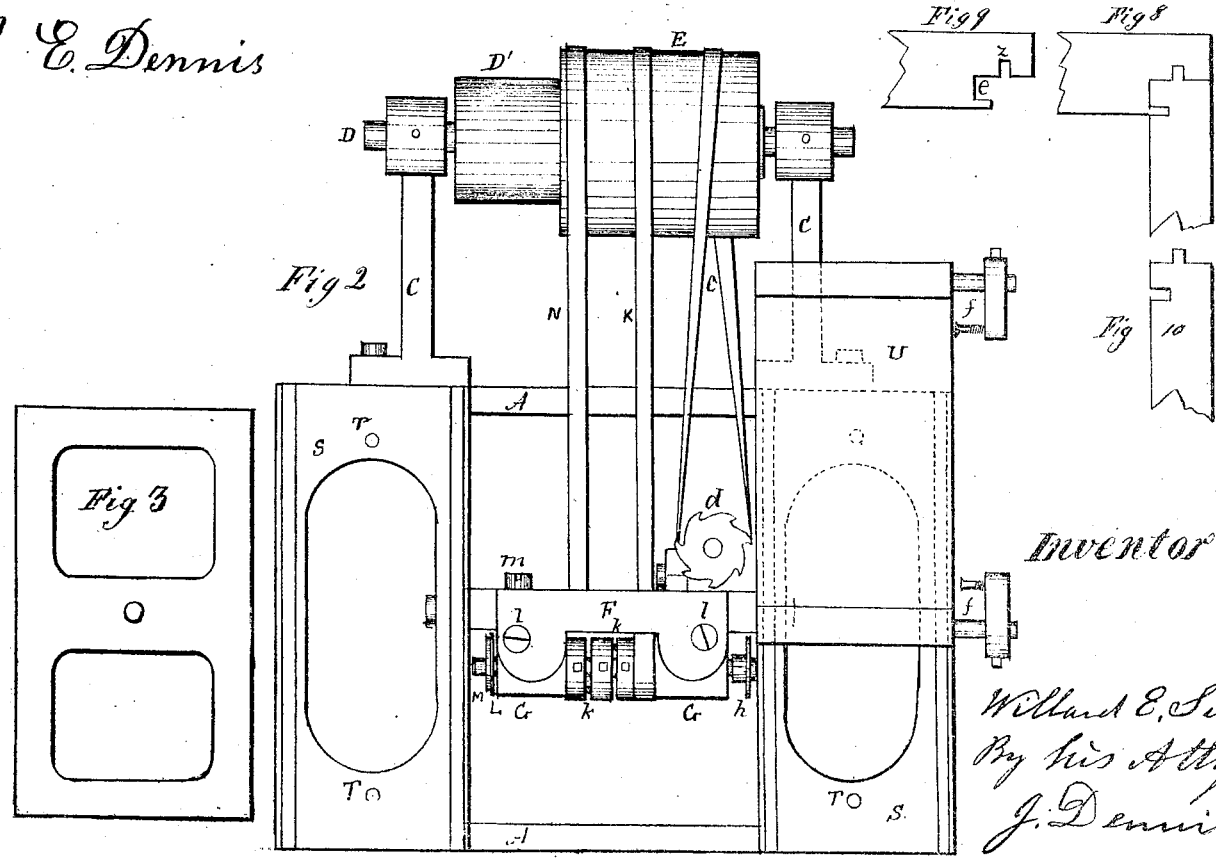

WILLARD E. SIBLEY, OF WESTON, MASSACHUSETTS.

Letters Patent No. 103,670, dated May 31, 1870.

IMPROVEMENT IN MACHINE FOR CUTTING DOVETAILS.

The Schedule referred to in these Letters Patent and making part of the same.

*To all whom it may concern:*

Be it known that I, WILLARD E. SIBLEY, of Weston, Middlesex county, in the State of Massachusetts, have invented certain new Improvements in Machines for Cutting Dovetails, Grooves, and Tenons; and I hereby declare the following to be a full and exact description thereof, reference being had to the accompanying drawing forming part of this specification.

The nature or essence of my invention consists in the improvements described and claimed in the following specification, and shown in the accompanying drawing, in which—

Figure 1 is an elevation of the front end, and
Figure 2 is a plan or top view.

In this drawing—

A shows the form of the front and rear ends, made of cast-iron, and fastened by screws to two side frames, also of iron, made in the form shown in fig. 3, making a strong frame to which the other parts are connected or attached.

I fasten the stand C C to the rear end A for the shaft D to turn in, which is provided with a pulley, D', for a band from some moving power to run the machine.

The shaft D also has the long pulley E on it to carry the belts that drive the cutter-shafts.

There is a central frame, F, fastened between the sides B, and made in the form shown, to hold the journal-boxes G G of the horizontal cutter-arbors H and I, which are fitted to turn in the boxes and carry to do the work.

The shaft H is provided with a pulley for the band, K, from the pulley E to turn the shaft H, and saw L to square the end of the board, and cutter M to cut a rabbet after it is squared.

The band N from the pulley E drives the pulley P and shaft I, carrying the cutters Q Q, one of which cuts a rabbet and the other a groove, as shown in the board, Figure 10, and cutters Figure 5.

The ends A are provided with horizontal flanges for the adjusting-screws R R, which support the ways frame S which rests upon them, and is held down and in place by the screws T T.

The left-hand ways frame is shown in fig. 2 without the carriage U, which is shown in Figure 6, and fitted to traverse on the ways, and provided with flanges V V at each end, to govern the position of the board being cut.

The shaft I, at its right-hand end, carries the saw W to square the end of the board, Figure 9, and the cutters X and Y to reduce the end of the board in thickness and cut the groove Z in it, (see cutters, Figure 4.)

Figure 11 shows the rear of the frame F with the boxes $a\ a$ for the perpendicular shaft $b$ to turn in, which is driven by the band $c$ and carries the cutter $d$, which cuts the groove $e$ in the board, fig. 9, so that when applied to the board, fig. 10, as shown in Figure 8, the two will be firmly locked together.

The carriage U is shown on the ways at the right hand side of fig. 2; it is provided with adjusting stops or gauges $f\ f$ to govern the length of the board, and when the block $g$, Figures 6 and 7, is put on it, the edges of the boards may be goroved (to receive the edges of the bottom of the draw or box made) by the cutter $h$ on the right-hand end of the shaft H, as shown in figs. 1 and 4.

There are three collars on each of the shafts H and I, one of which is fastened to the pulley, and they are all provided with set-screws to lock them to the shaft, and the center collar on each shaft is provided with set-screws on each side, as shown at $k\ k$, fig. 2, so that, by loosening the set-screws that lock the two outside collars and turning the screws $k\ k$, the shafts H and I may be adjusted endwise in the journal-boxes to adjust the cutters to their work.

The journal-boxes may be also adjusted higher or lower by the screws $l\ l$, and fastened in their proper position by the screws $m\ m$, fig. 11.

The perpendicular shaft $b$ may be adjusted horizontally by the slots and screws $n\ n$, fig. 1, which hold its journal-boxes and the temper-screw $p$, shown in fig. 11.

The machine having been constructed and arranged as described, and some boards prepared, they are placed on the carriages, and held there while the carriage is traversed past the cutters, which cuts the ends into the proper form to lock together, as shown in fig. 8.

Having described my improvements,

I claim—

1. The arrangement of the collars $k'\ k'$, and set-screws $k\ k$, for adjusting the shafts H and I endwise, substantially as shown and described.

2. The arrangement of the cutter X between the saw W and cutter Y, substantially as shown and described.

3. The arrangement of the saws and cutters, as shown and described, for the purpose specified.

WILLARD E. SIBLEY.

Witnesses:
F. R. C. KITTREDGE,
R. S. WARREN.